(12) United States Patent
Taguchi et al.

(10) Patent No.: US 10,003,277 B2
(45) Date of Patent: Jun. 19, 2018

(54) POWER CONVERSION DEVICE

(71) Applicant: DAIKIN INDUSTRIES, LTD., Osaka-shi, Osaka (JP)

(72) Inventors: Yasutaka Taguchi, Osaka (JP); Junya Mitsui, Osaka (JP); Akira Moriguchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days. days.

(21) Appl. No.: 15/511,289

(22) PCT Filed: Aug. 5, 2015

(86) PCT No.: PCT/JP2015/003944
§ 371 (c)(1),
(2) Date: Mar. 15, 2017

(87) PCT Pub. No.: WO2016/047019
PCT Pub. Date: Mar. 31, 2016

(65) Prior Publication Data
US 2017/0288567 A1  Oct. 5, 2017

(30) Foreign Application Priority Data
Sep. 26, 2014 (JP) .................................. 2014-197278

(51) Int. Cl.
*H02M 7/155* (2006.01)
*H02M 1/12* (2006.01)
(Continued)

(52) U.S. Cl.
CPC ............. *H02M 7/1557* (2013.01); *H02M 1/12* (2013.01); *H02M 1/32* (2013.01); *H02M 1/44* (2013.01); *H02M 5/458* (2013.01)

(58) Field of Classification Search
CPC ......... H02M 7/1557; H02M 1/44; H02M 1/32; H02M 5/458; H02M 1/12; H02P 27/06; H02P 27/08; H02P 27/085
See application file for complete search history.

(56) References Cited

U.S. PATENT DOCUMENTS 5,748,459 A     5/1998  Yamada et al.
6,134,126 A  *  10/2000  Ikekame ................... H02J 3/01
                                                      307/105
(Continued)

FOREIGN PATENT DOCUMENTS

JP     2002-272132 A     9/2002
JP     2004-364344 A    12/2004
(Continued)

OTHER PUBLICATIONS

International Search Report, issued in PCT/JP2015/003944 (PCT/ISA/210), dated Nov. 2, 2015.

*Primary Examiner* — Kyle J Moody
(74) *Attorney, Agent, or Firm* — Birch, Stewart, Kolasch & Birch, LLP

(57) ABSTRACT

A power converter including a compressor as a load includes a compensation current output (80) allowing compensation current (Ic), which compensates for leakage current (Ia), to flow. A controller (50) receives a detection signal from a rotational speed sensor (55) which senses the rotational speed of the compressor (CM). When the rotational speed has increased to a set rotational speed at which the leakage current (Ia) is lower than or equal to its limiting value (Lmax) (e.g., the limiting value specified under the Electrical Appliances and Materials Safety Act or by the IEC) in a state where the compensation current output (80) is off, the compensation current output (80) is switched from an on
(Continued)

state to an off state. This may reduce the leakage current from the compressor with low power loss.

3 Claims, 5 Drawing Sheets

(51) Int. Cl.
    *H02M 5/458*     (2006.01)
    *H02M 1/32*     (2007.01)
    *H02M 1/44*     (2007.01)

(56) References Cited

U.S. PATENT DOCUMENTS

| | | | |
|---|---|---|---|
| 6,151,228 A * | 11/2000 | Miyazaki | H02J 3/01 363/37 |
| 6,459,597 B1 * | 10/2002 | Igarashi | H02M 1/12 363/34 |
| 9,312,780 B2 * | 4/2016 | Taguchi | H02M 7/48 |
| 2006/0049784 A1 * | 3/2006 | Suzuki | B62D 5/046 318/400.3 |
| 2013/0155731 A1 * | 6/2013 | Reichard | H02M 5/453 363/37 |
| 2015/0009725 A1 | 1/2015 | Taguchi | |

FOREIGN PATENT DOCUMENTS

JP             5316656 B2    10/2013
WO    WO 2013/111403 A1    8/2013

* cited by examiner

POWER CONVERSION DEVICE

TECHNICAL FIELD

The present invention relates to a technique for reducing leakage current from a load.

BACKGROUND ART

In general, if a load of a power converter is, for example, an electric motor, a capacitance between the electric motor and the ground causes leakage current to flow from the electric motor through the capacitance to the ground along with an output of a pulse voltage in the power converter. To reduce the leakage current, according to the configuration adopted in, for example, Patent Document 1, compensation current has been allowed to flow to compensate for the leakage current only when the magnitude of an instantaneous value or peak value of a voltage across a coil through which a current of an alternating-current waveform corresponding to a leakage current detected by a leakage current detector or a monitor current proportional to the detected current flows exceeds a predetermined threshold.

According to the configuration adopted in Patent Document 1 described above, if a power factor improvement circuit provided for a power converter is on (specifically, the duty cycle of a built-in switching element is controlled), compensation current is allowed to flow. If the power factor improvement circuit is off (the built-in switching element is kept off), supply of compensation current is stopped. Thus, only a large leakage current allows the compensation current to flow, resulting in a reduction in power loss.

CITATION LIST

Patent Document

Patent Document 1: Japanese Patent No. 5316656

SUMMARY OF THE INVENTION

Technical Problem

In a situation where a compressor disposed in a refrigerant circuit of a refrigeration apparatus was connected, as a load, to the power converter, the present inventors actually measured leakage current from the compressor in operation. This showed that an increase in rotational speed allowed a large amount of lubricating oil in the compressor to be supplied from the inside of the compressor into refrigerant pipes of the refrigeration apparatus and heat exchangers. This increased the impedance of the compressor itself, resulting in a decrease in leakage current.

Thus, the characteristics of the leakage current of the compressor that have just been described show that if its rotational speed falls within the rotational speed range within which just after activation of the compressor, the rotational speed increases to a rotational speed at which leakage current is equal to the limiting value specified under the Electrical Appliances and Materials Safety Act and by the International Electrotechnical Commission (IEC), the leakage current does not need to be intentionally reduced, and no compensation current needs to be allowed to flow.

Unfortunately, the invention described in Patent Document 1 shows the following drawback: control based on the detected current corresponding to the leakage current or the voltage across the coil and control based on whether the power factor improvement circuit is on or off both allow compensation current to flow even under operating conditions where the leakage current is lower than or equal to the limiting value specified by the regulations. This increases power loss.

In particular, under control based on whether the power factor improvement circuit is on or off, the leakage current increases in a state where the power factor improvement circuit is turned on to suppress power line harmonics. However, even in this state, the leakage current may be lower than or equal to the limiting value specified by the regulations. This increases power loss.

In addition, under the control based on the detection current corresponding to leakage current or the voltage across the coil, compensation current supplied by such control reduces the leakage current. This creates a need to provide a large control hysteresis to prevent hunting. However, an excessively large hysteresis causes a compensation current larger than necessary to flow. This increases power loss, and reduces the annual performance factor (APF).

Moreover, operation of a circuit which feeds compensation current (a leakage current canceller circuit) increases, due to a switching operation of the circuit, an external leakage of electro magnetic interference (EMI) noise (electromagnetic noise). This increases costs for meeting the EMI standard. In particular, in a high rotation region of a compressor, the amount of power to be handled is increased. This also increases switching noise in a converter circuit or an inverter circuit provided for a power converter, resulting in an increase in EMI noise. Thus, in the high rotation region, switching noises are simultaneously caused by three components (i.e., the leakage current canceller circuit, the converter circuit, and the inverter circuit). This extremely increases costs for lowering total EMI noise (i.e., a combination of these switching noises) to a level specified.

In view of the foregoing background, it is therefore an object of the present invention to allow a power converter connected to a compressor as a load to stop supplying compensation current in an operating region where leakage current is lower than or equal to a limiting value specified under the Electrical Appliances and Materials Safety Act or by the IEC, thereby reducing power loss and improving the APF.

Solution to the Problem

A power converter according to the present invention includes: a converter circuit (10) configured to convert alternating current into direct current; and an inverter circuit (40) connected to the converter circuit (10), and configured to convert the direct current, into which the alternating current has been converted, into alternating current. The power converter is configured to supply the alternating current, into which the direct current has been converted by the inverter circuit (40), to a compressor (CM). The power converter further includes: a compensation current output (80) configured to output compensation current (Ic), which compensates for leakage current (Ia) leaking from the compressor (CM), to a current path through which the leakage current (Ia) flows; and a controller (50) configured to switch between on and off operations of the compensation current output (80) according to a rotational speed of the compressor (CM).

According to the present invention, the compensation current output is controlled to switch between an on state and an off state according to the rotational speed of the compressor. The leakage current from the compressor increases or decreases according to the rotational speed of the compressor. Thus, whether the compensation current is supplied may be controlled according to the magnitude of the leakage current.

In the power converter according to the present invention, the controller (50) may switch the compensation current output (80) from an on state to an off state when the rotational speed of the compressor (CM) has increased to a set rotational speed (Rlh, Rlc) at which the leakage current (Ia) is lower than or equal to a predetermined limiting value (Lmax) in a state where the compensation current output (80) is off.

According to the present invention, after activation of the compressor, the compensation current output is switched from an on state to an off state at the set rotational speed at which the leakage current from the compressor is lower than or equal to a predetermined limiting value (e.g., the limiting value specified under the Electrical Appliances and Materials Safety Act or by the IEC). This may reduce power loss while specifications are met.

In the power converter according to the present invention, the compressor (CM) may be disposed in a refrigerant circuit (90) having cooling and heating operation modes, and the controller (50) may control the set rotational speed (Rlh, Rlc) so that the set rotational speed (Rlc) in the cooling operation mode is different from the set rotational speed (Rlh) in the heating operation mode.

According to the present invention, the set rotational speed at which the leakage current is lower than or equal to the predetermined limiting value is controlled so that the set rotational speed in the cooling operation mode is different from the set rotational speed in the heating operation mode. Thus, even if the magnitude of the leakage current according to the compressor rotational speed in a cooling operation is different from that in a heating operation, power loss may be reduced while specifications are met, irrespective of the operation mode.

Advantages of the Invention

According to the present invention, whether compensation current is supplied is controlled according to the rotational speed of a compressor. This may reduce power loss and improve the APF as compared to a situation where, as in the known art, the compensation current is always supplied during operation of a compressor.

According to the present invention, the compensation current may stop being supplied at the rotational speed of the compressor at which the leakage current is lower than or equal to, for example, the limiting value specified. This may reduce power loss while the specifications are met.

Furthermore, according to the present invention, power loss may be reduced while the specifications are met, irrespective of the operation mode.

DESCRIPTION OF EMBODIMENTS

Embodiments of the present invention will now be described with reference to the accompanying drawings. The following embodiments are merely beneficial examples in nature, and are not intended to limit the scope, application, or uses of the present invention.

First Embodiment of the Invention

Figure 1:
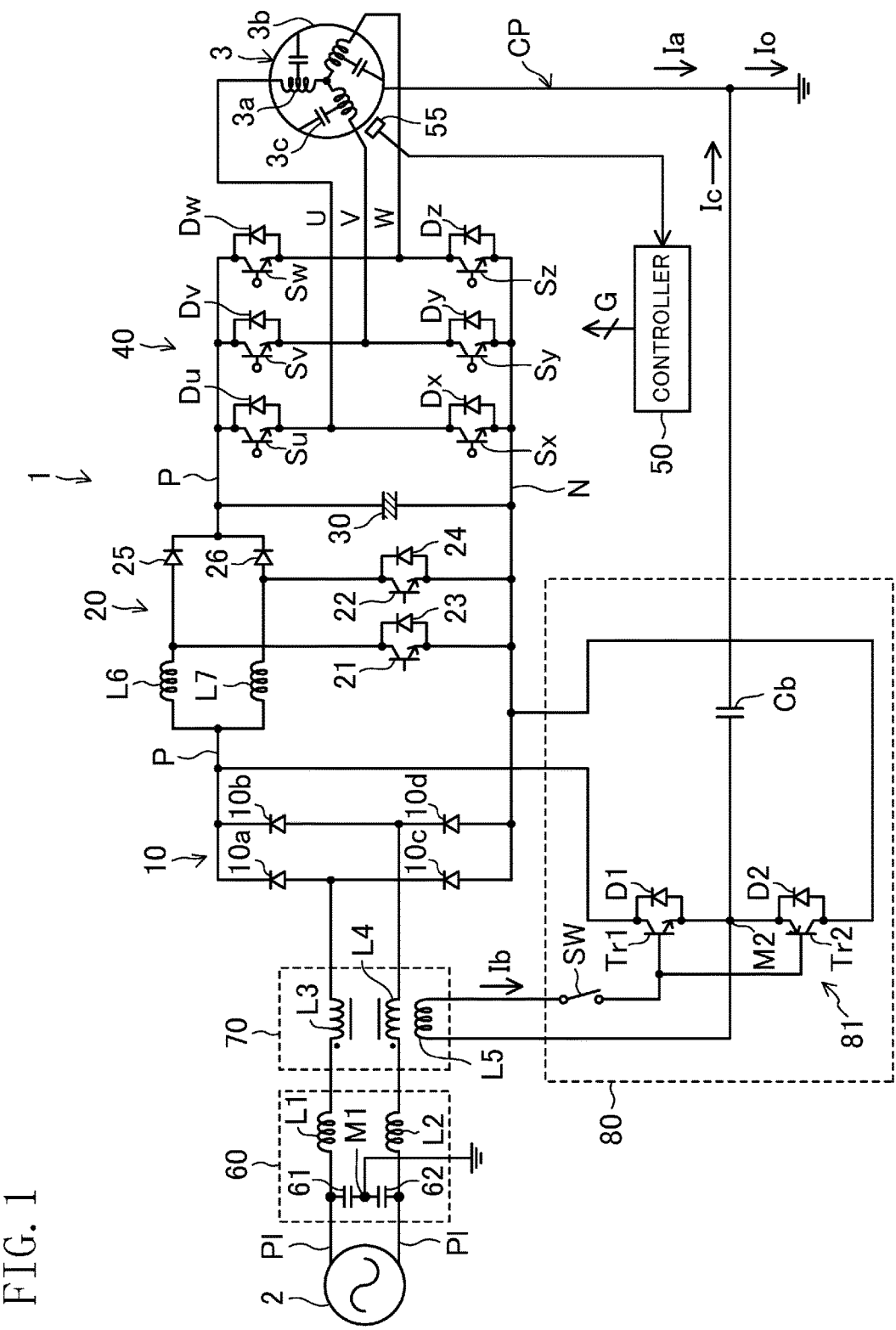
FIG. 1 is an electric circuit diagram showing a configuration for a power converter according to an embodiment of the present invention.

FIG. 1 shows a configuration for a power converter (1) according to a first embodiment of the present invention. In this example, the power converter (1) is used to supply power to a compressor (not shown in FIG. 1) of an air conditioner (more particularly, a motor (3) driving the compressor).

Figure 2:
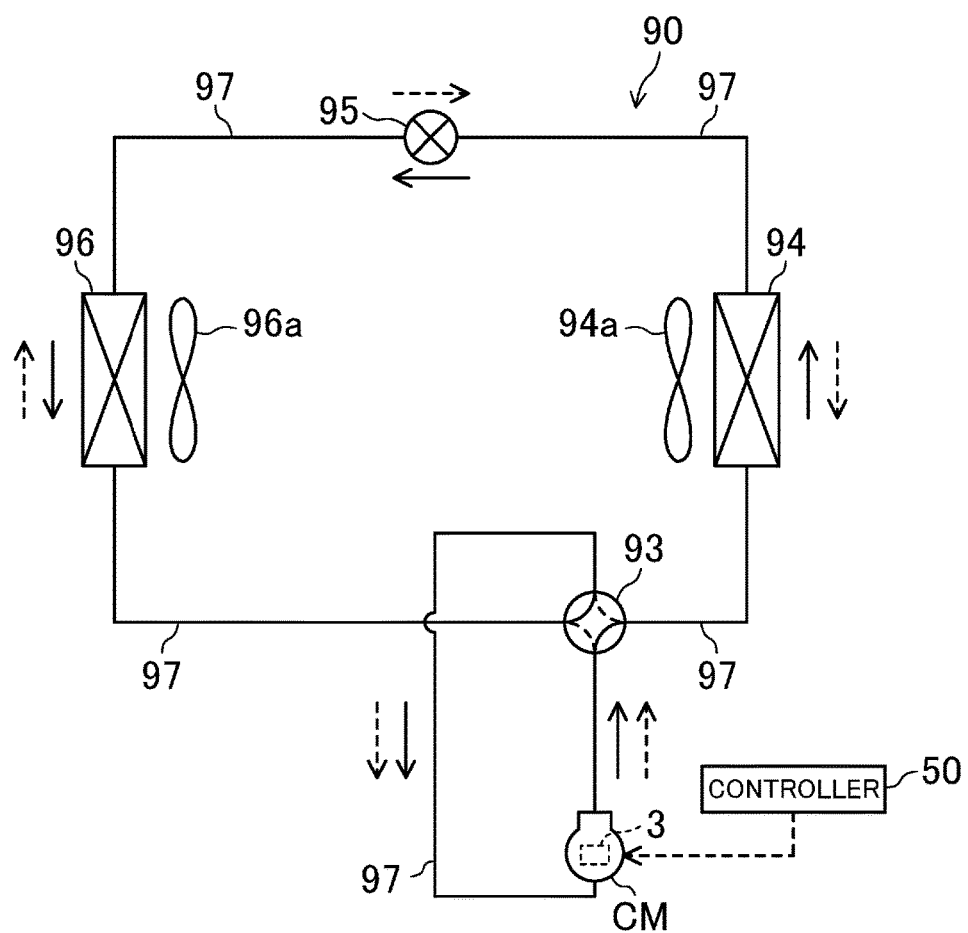
FIG. 2 shows a refrigerant circuit of a refrigeration apparatus including a compressor connected to the power converter.

FIG. 2 shows a refrigerant circuit of, for example, an air conditioner provided with a compressor including the motor (3). In FIG. 2, the compressor (CM) includes the motor (3), and is disposed in a refrigerant circuit (90).

The refrigerant circuit (90) includes: the compressor (CM); a four-way valve (93); an air-cooling indoor heat exchanger (94) including a cooling fan (94a); an electric expansion valve (95) having a valve body driven by a pulse motor and having a variable degree of opening; and an air-cooling outdoor heat exchanger (96) including a cooling fan (96a). These components are sequentially connected to a closed circuit through a refrigerant pipe (97) to form a refrigeration cycle. In a heating operation mode, the four-way valve (93) is switched as indicated by the solid lines to allow a refrigerant to flow as indicated by the solid arrows. This allows the indoor heat exchanger (94) to dissipate an amount of heat absorbed by the outdoor heat exchanger (96) into a room to heat the room. On the other hand, in a cooling operation mode, the four-way valve (93) is switched as indicated by the broken lines to allow a refrigerant to flow as indicated by the broken arrows. This allows the outdoor heat exchanger (96) to dissipate an amount of heat absorbed from the interior of the room by the indoor heat exchanger (94) into outdoor air to cool the room.

The compressor (CM) houses therein the motor (3) as indicated by the broken line. Lubricating oil is supplied into the compressor (CM) to lubricate a rotating portion and other portions of the compressor (CM). During operation of the compressor (CM), the lubricating oil circulates through the refrigerant circuit (90) together with the refrigerant, and returns to the compressor (CM).

The compressor (CM), the cooling fan (94a) of the indoor heat exchanger (94), the electric expansion valve (95), and the cooling fan (96a) of the outdoor heat exchanger (96) are connected to a controller (50), which controls the rotational speed of the motor (3) of the compressor (CM), the rotational speed of the cooling fan (94a) of the indoor heat exchanger (94), the degree of opening of the electric expansion valve (95), and the rotational speed of the cooling fan (96a) of the outdoor heat exchanger (96).

As shown in FIG. 1, the power converter (1) includes a converter circuit (10), a power factor improver (20), a smoothing capacitor (30), an inverter circuit (40), the controller (50), a line filter (60), a leakage current detector (70), and a compensation current output (80). The power converter (1) converts alternating-current power supplied from a single-phase alternating-current power supply (2) into alternating-current power with a predetermined frequency and a predetermined voltage, and supplies the resultant alternating-current power to the motor (3). Examples of the motor (3) include a so-called interior permanent magnet (IPM) motor.

A casing (3b) for the motor (3) serves also as a casing for the compressor (CM). The casing (3b) (i.e., the compressor (CM)) is fixed in a casing for the outdoor heat exchanger (96) of the air conditioner. At this time, the casing (3b) for the motor (3) is also electrically connected to an outdoor unit of the air conditioner. The casing for the outdoor heat exchanger (96) is connected to a ground lead, and is grounded.

Converter Circuit

The converter circuit (10) rectifies alternating current from the alternating-current power supply (2) to direct current. In this embodiment, the converter circuit (10) is a diode bridge circuit in which four diodes (10a-10d) are connected together in a bridge configuration. These diodes (10a-10d) perform a full-wave rectification on an alternating voltage from the alternating-current power supply (2) to convert the alternating voltage into a direct voltage.

Power Factor Improver

As shown in FIG. 1, the power factor improver (20) is provided between the converter circuit (10) and the smoothing capacitor (30). The power factor improver (20) according to this embodiment is a two-phase interleaved boost chopper circuit, and includes two reactors (L6, L7), two switching elements (21, 22), and four diodes (23, 24, 25, 26). The power factor improver (20) boosts the voltage by repeating the on/off operations of the switching elements (21, 22) at a predetermined duty cycle. This increases the conduction angle for the diodes (10a-10d) of the converter circuit (10), resulting in improvement in power factor.

Capacitor

The smoothing capacitor (30) smooths the direct voltage boosted by the power factor improver (20). In this example, an electrolytic capacitor is used as the smoothing capacitor (30).

Inverter Circuit

The inverter circuit (40) has an input node connected to the smoothing capacitor (30), switches direct current supplied to convert the direct current into three-phase alternating currents (U, V, W), and supplies the voltages to the compressor (CM) (more particularly, the motor (3)) functioning as the load connected to the inverter circuit.

The inverter circuit (40) according to this embodiment includes six switching elements (Su, Sv, Sw, Sx, Sy, Sz) connected together in a bridge configuration to output the three-phase alternating currents to the motor (3). More specifically, the inverter circuit (40) includes three switching legs each comprised of two switching elements connected in series. In the three switching legs, midpoints between the upper-arm switching elements (Su, Sv, Sw) and the lower-arm switching elements (Sx, Sy, Sz) are connected to coils of respective phases (described below) of the motor (30). Further, freewheeling diodes (Du, Dv, Dw, Dx, Dy, Dz) are respectively connected to the switching elements (Su, Sv, Sw, Sx, Sy, Sz) in anti-parallel.

The inverter circuit (40) switches the supplied direct current by switching operations of these switching elements (Su, Sv, Sw, Sx, Sy, Sz) to convert the voltage into three-phase alternating voltages, and supplies the voltages to the motor (3). The controller (50) controls these switching operations.

Controller

The controller (50) includes a microcomputer (not shown), and a memory device in which a program used to operate the microcomputer is stored. This memory device may be built in the microcomputer. The controller (50) outputs a control signal (G) to the switching elements (Su, Sv, Sw, Sx, Sy, Sz) of the inverter circuit (40) to control the switching operations, thereby controlling the motor (3). In this example, the controller (50) uses d-q axis vector control to control the motor (3).

Line Filter

The line filter (60) includes two reactors (L1, L2), and two capacitors (61, 62). The reactors (L1, L2) are each provided on an associated one of alternating current input lines (P1) receiving power from the alternating-current power supply (2). The capacitors (61, 62) are connected together in series, and are connected between the two alternating current input lines (P1). The midpoint (M1) between the two capacitors (61, 62) is connected to the ground through a ground lead.

Leakage Current Detector

The leakage current detector (70) detects detection current (Ib) correlated with leakage current (Ia) (described below) from the motor (3). In this example, as shown in FIG. 1, the leakage current detector (70) includes a pair of common mode choke coils (L3, L4) and a detection coil (L5). The common mode choke coils (L3, L4) are each provided on a portion of an associated one of the alternating current input lines (P1) between the line filter (60) and the converter circuit (10). The detection coil (L5) is inductively coupled to the common mode choke coils (L3, L4). This allows the detection current (Ib) corresponding to a difference in current between the alternating current input lines (P1) to flow through the detection coil (L5). The difference varies according to the leakage current (Ia). The detection current (Ib) is correlated with the leakage current (Ia).

Compensation Current Output

The compensation current output (80) supplies compensation current (Ic) for canceling the leakage current (Ia) to a current path (CP) (described below) for the leakage current (Ia) through a push pull circuit (81) described below in detail. Specifically, the compensation current output (80) amplifies the detection current (Ib) through the push pull circuit (81), and superimposes the amplified detection current over the leakage current (Ia).

The push pull circuit (81) includes two transistors (Tr1, Tr2), two diodes (D1, D2), and a coupling capacitor (Cb) as shown in FIG. 1. The coupling capacitor (Cb) is used to interrupt direct current. Examples of the coupling capacitor (Cb) include a capacitor of 4700 pF.

The transistor (Tr1) is an NPN transistor, and the transistor (Tr2) is a PNP transistor. The transistors (Tr1) and (Tr2)

are connected together in series. Specifically, a controlled terminal of the transistor (Tr1) through which current flows out of the transistor (Tr1) is connected to a controlled terminal of the transistor (Tr2) through which current flows into the transistor (Tr2). The midpoint (M2) between these transistors (Tr1, Tr2) is connected to the current path (CP) for the leakage current (Ia) through the coupling capacitor (Cb) as described below in detail.

The diode (D1) is connected to the transistor (Tr1) in anti-parallel, and the diode (D2) is connected to the transistor (Tr2) in anti-parallel. A reverse bias voltage may be applied to the transistor (Tr1) or (Tr2). If the reverse bias voltage exceeds the breakdown voltage of the transistor (Tr1, Tr2), the transistor (Tr1, Tr2) breaks down. To address this problem, these diodes (D1, D2) protect the transistors (Tr1, Tr2) against overvoltage.

A controlled terminal of the transistor (Tr1) through which current flows into the transistor (Tr1) is connected to the positive output of the converter circuit (10) (more specifically, to a positive direct current bus (P) between the converter circuit (10) and the inverter circuit (40)). On the other hand, a controlled terminal of the transistor (Tr2) through which current flows out of the transistor (Tr2) is connected to the negative output of the converter circuit (10) (more specifically, to a negative direct current bus (N) between the converter circuit (10) and the inverter circuit (40)).

The detection current (Ib) is supplied to control terminals of both the transistors (Tr1, Tr2). Thus, the push pull circuit (81) may output the compensation current (Ic) with a magnitude correlated with that of the leakage current (Ia). Note that the polarity of the detection current (Ib) is set such that the compensation current (Ic) is opposite in phase to the leakage current (Ia).

—Connection of Output of Compensation Current Output (80)—

In the motor (3), a stray capacitance (3c) is formed between each coil (3a) and the casing (3b) (see FIG. 1). Thus, voltage variations (dv/dt) across the coil (3a) of the motor (3) due to switching of the inverter circuit (40) causes the leakage current (Ia) to flow out of the casing (3b) of the motor (3). The leakage current (Ia) flows to the ground through the casing (3b) of the motor (3) (in this example, the casing of the compressor (CM)), the casing of the outdoor heat exchanger (96), and the ground lead of the outdoor heat exchanger (96) which form the current path (CP).

Thus, in this embodiment, the output of the compensation current output (80) (the coupling capacitor (Cb)) is connected to, for example, the casing (3b) of the motor (3). Naturally, this connection point is merely an example. Another point on the current path (CP) may be selected as the connection point.

—Control of Compensation Current Output (80)—

The compensation current output (80) includes a switch (SW) to switch between activation and deactivation of the compensation current output (80). The switch (SW) is specifically disposed somewhere along an interconnect path through which the detection current (Ib) detected by the detection coil (L5) of the leakage current detector (70) is supplied to the control terminals of the two transistors (Tr1, Tr2). Thus, when the switch (SW) opens, the push pull circuit (81) is turned off to stop generating and outputting the compensation current (Ic).

The controller (50) controls opening/closing of the switch (SW). To perform the control, the controller (50) stores the previously measured characteristic diagram of the compressor (CM) shown in FIG. 3.

The characteristic diagram plots the rotational speed of the compressor (CM) (i.e., the rotational speed of the motor (3)) as the abscissa, and the leakage current (Ia) leaking from the compressor (CM) as the ordinate. The characteristic diagram shows leakage current characteristics obtained in two modes (i.e., cooling and heating operation modes of the air conditioner) while the compensation current output (80) is off (i.e., while no compensation current is supplied). The characteristics (CHhoff) and (CHcoff) in both of the operation modes show that the leakage current initially increases as the rotational speed of the compressor (CM) increases from a low rotational speed immediately after the activation of the compressor (CM), whereas the leakage current subsequently decreases gradually as the rotational speed increases. The reason why the characteristics have the tendency described above is that the impedance of the compressor (CM) increases, and as a result, the leakage current decreases gradually, because increasing the rotational speed of the compressor (CM) to some extent increases the amount of the lubricating oil discharged from the compressor (CM) accordingly, so that the size of a portion of the coil (3a) of the motor (3) exposed above the lubricating oil accumulated in the compressor (CM) increases.

Out of the two characteristics (CHhoff) and (CHcoff), the characteristic (CHcoff) in the cooling operation mode shows smaller leakage current generated in all rotational speed ranges than that shown by the characteristic (CHhoff) in the heating operation mode. The reason for this is that in the cooling operation mode, the impedance of the compressor (CM) is higher than that in the heating operation mode, because in the cooling operation mode, the amount of the lubricating oil accumulated in the indoor heat exchanger (94) is larger than in the heating operation mode, and the amount of the lubricating oil in the compressor (CM) is smaller than in the heating operation mode.

Figure 3:
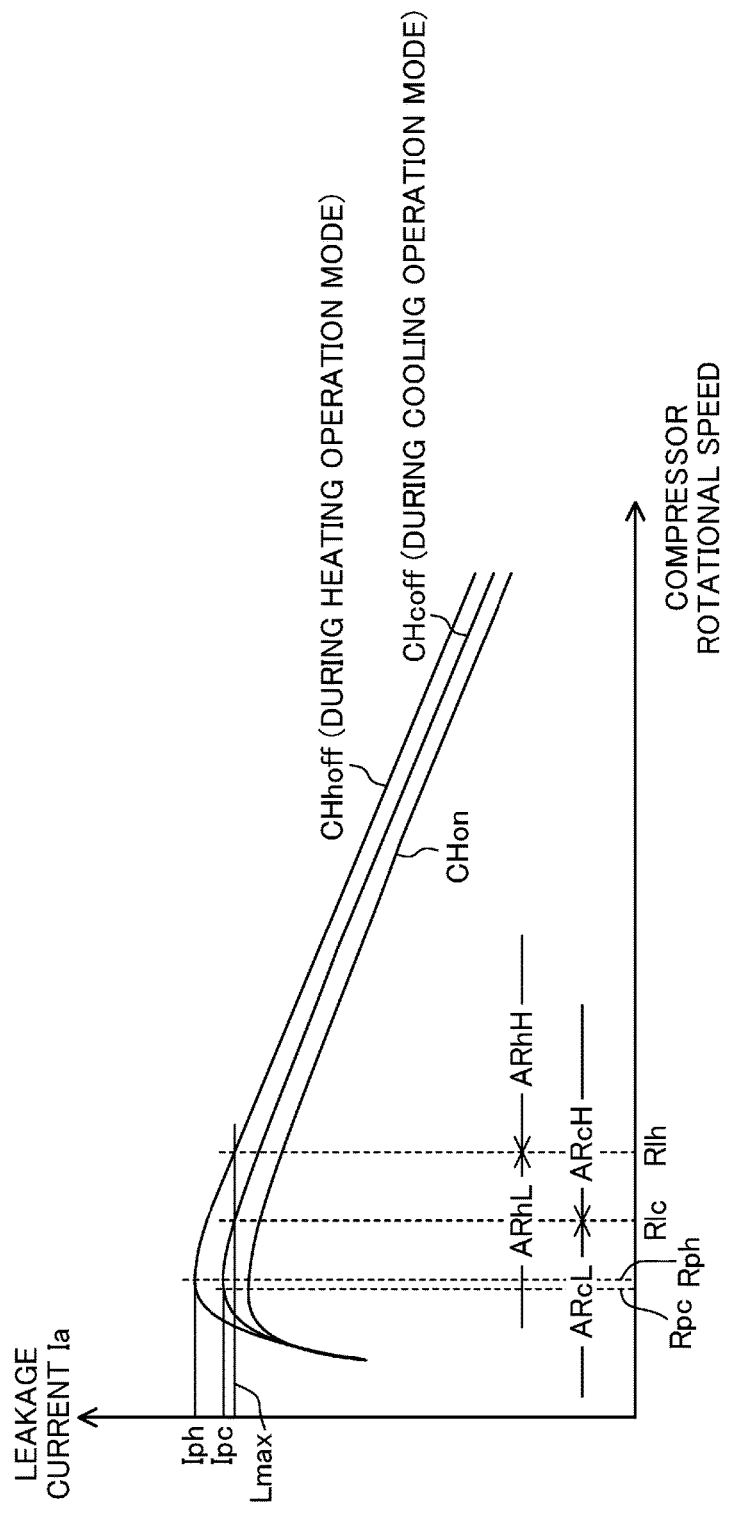
FIG. 3 is a characteristic diagram showing the magnitude of leakage current relative to the rotational speed of the compressor connected to the power converter.

In the characteristic (CHhoff) in the heating operation mode, the rotational speed at a peak value (Iph) of the leakage current is a rotational speed (Rph), and the set rotational speed corresponding to a limiting value (Lmax) which is lower than the peak value (Iph) and which is specified under the Electrical Appliances and Materials Safety Act or by the IEC is a rotational speed (Rlh). On the other hand, in the characteristic (CHcoff) in the cooling operation mode, the rotational speed at a peak value (Ipc) of the leakage current is a rotational speed (Rpc), which is lower than the peak rotational speed (Rph) in the characteristic (CHhoff) in the heating operation mode (Rpc<Rph). In the characteristic (CHcoff) in the cooling operation mode, the set rotational speed corresponding to the limiting value (Lmax) is a rotational speed (Rlc), which is lower than the set rotational speed (Rlh) in the characteristic (CHhoff) in the heating operation mode (Rlc<Rlh). FIG. 3 shows not only the two leakage current characteristics (CHhoff) and (CHcoff) obtained while the compensation current output (80) is off, but also the leakage current characteristic (CHon) obtained while the compensation current output (80) is on, i.e., while compensation current is allowed to flow. The leakage current characteristic (CHon) shows smaller leakage current in all rotational speed ranges than that shown by each of the two leakage current characteristics (CHhoff) and (CHcoff) and obtained while the compensation current output (80) is off. In addition, a peak value of the leakage current in the leakage current characteristic (CHon) is lower than the limiting value (Lmax).

As shown in FIG. 1, the controller (50) receives a rotational speed signal from a rotational speed sensor (55) which senses the rotational speed of the compressor (CM) (the motor (3)), and controls the opening/closing of the switch (SW) of the compensation current output (80) based on the rotational speed indicated by the rotational speed signal. Specifically, the controller (50) controls the switch (SW) to be closed after the activation of the compressor (CM) and until the rotational speed reaches the set rotational speed (Rlh, Rlc) corresponding to the limiting value (Lmax) (i.e., in the heating operation mode, while the rotational speed falls within the rotational speed range (ARhL) lower than the set rotational speed (Rlh) of the characteristic (CHcoff); and in the cooling operation mode, while the rotational speed falls within the rotational speed range (ARcL) lower than the set rotational speed (Rlc) of the characteristic (CHcoff)). In this manner, the compensation current output (80) is turned on to allow the compensation current (Ic) to flow. On the other hand, if the rotational speed of the compressor (CM) reaches the set rotational speed (Rlh, Rlc), the switch (SW) is controlled to open. In this manner, the compensation current output (80) is turned off to stop supplying the compensation current (Ic). Then, stop control of the compensation current output (80) is continued while the rotational speed falls within the rotational speed range (ARhH, ARcH) exceeding the set rotational speed (Rlh, Rlc).

Operation of Power Converter

A switching operation of the inverter circuit (40) allows the leakage current (Ia) to start flowing from the motor (3) of the compressor (CM). The flow of the leakage current (Ia) causes the difference in current between the alternating current input lines (P1) to vary. The detection coil (L5) of the leakage current detector (70) generates a voltage according to that difference. The leakage current detector (70) outputs the detection current (Ib) to the compensation current output (80) with the switch (SW) of the compensation current output (80) closed.

In the compensation current output (80), the detection current (Ib) is input to the control terminals of both the transistors (Tr1, Tr2) with the switch (SW) closed. This allows any one of the transistors (Tr1, Tr2) to perform an amplification operation according to the polarity of the detection current (Ib), and the compensation current (Ic) is then output to the current path (CP). The compensation current (Ic) is opposite in phase to the leakage current (Ia). Appropriately determining the amplification factors of the transistors (Tr1, Tr2), the number of turns of the detection coil (L5), and other parameters allows the compensation current (Ic) to have a magnitude large enough to adequately reduce the leakage current (Ia). Thus, when joining the leakage current (Ia), the compensation current (Ic) reduces the current (Io) (see FIG. 1) flowing into the ground.

—Operation of Compensation Current Output (80)—

If, after the activation of the compressor (CM), the rotational speed of the compressor (CM) falls within the rotational speed range (ARhL) or (ARcL) lower than the set rotational speed corresponding to the limiting value (Lmax) shown in FIG. 3 (i.e., the rotational speed (Rlh) in the heating operation mode and the rotational speed (Rlc) in the cooling operation mode), the controller (50) controls the switch (SW) of the compensation current output (80) to be closed. As can be seen, the detection current (Ib) from the leakage current detector (70) flows through the compensation current output (80) as described above, and the compensation current (Ic) is supplied to the current path (CP) to reduce the leakage current (Ia).

Then, when the rotational speed of the compressor (CM) increases from the rotational speed range (ARhL) or (ARcL) to the set rotational speed (Rlh) or (Rlc) corresponding to the limiting value (Lmax), the controller (50) controls the switch (SW) of the compensation current output (80) to be open. Thus, the compensation current output (80) stops operating, and the compensation current (Ic) stops being supplied. Then, when the rotational speed of the compressor (CM) falls within the rotational speed range (ARhH) or (ARcH) higher than or equal to the set rotational speed (Rlh) or (Rlc) with an increase in the rotational speed of the compressor (CM), the controller (50) keeps controlling the switch (SW) of the compensation current output (80) to be open.

Figure 4:
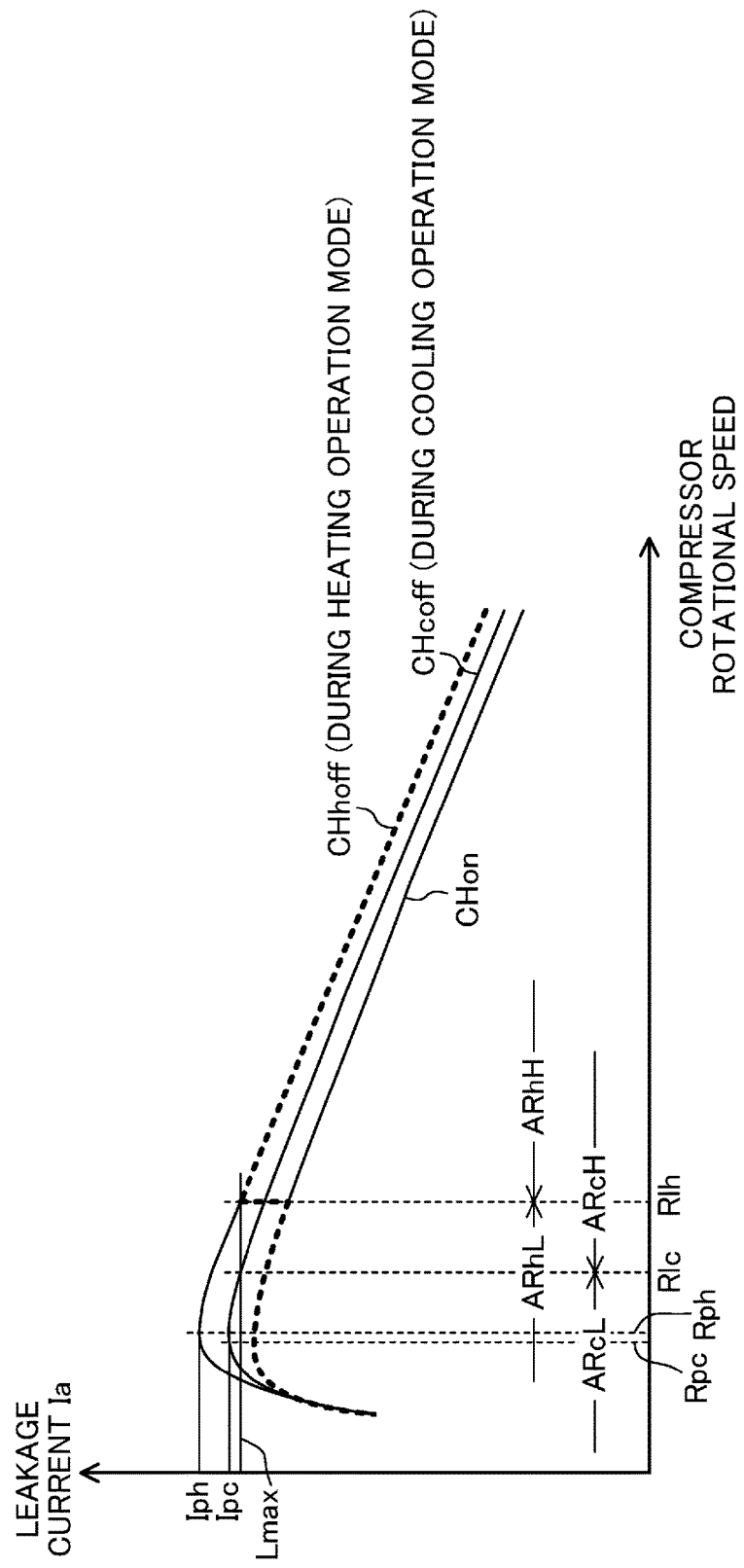
FIG. 4 shows how leakage current is controlled in a heating operation mode.

As can be seen, in the heating operation mode, while the rotational speed falls within the rotational speed range (ARhL) lower than the set rotational speed (Rlh) corresponding to the limiting value (Lmax), the compensation current output (80) operates to allow the compensation current (Ic) to flow so that the leakage current (Ia) becomes less than the limiting value (Lmax), as indicated by the broken line shown in FIG. 4. After the rotational speed has reached the set rotational speed (Rlh), the compensation current output (80) stops, so that the leakage current (Ia) increases to the limiting value (Lmax), and then decreases gradually.

Figure 5:
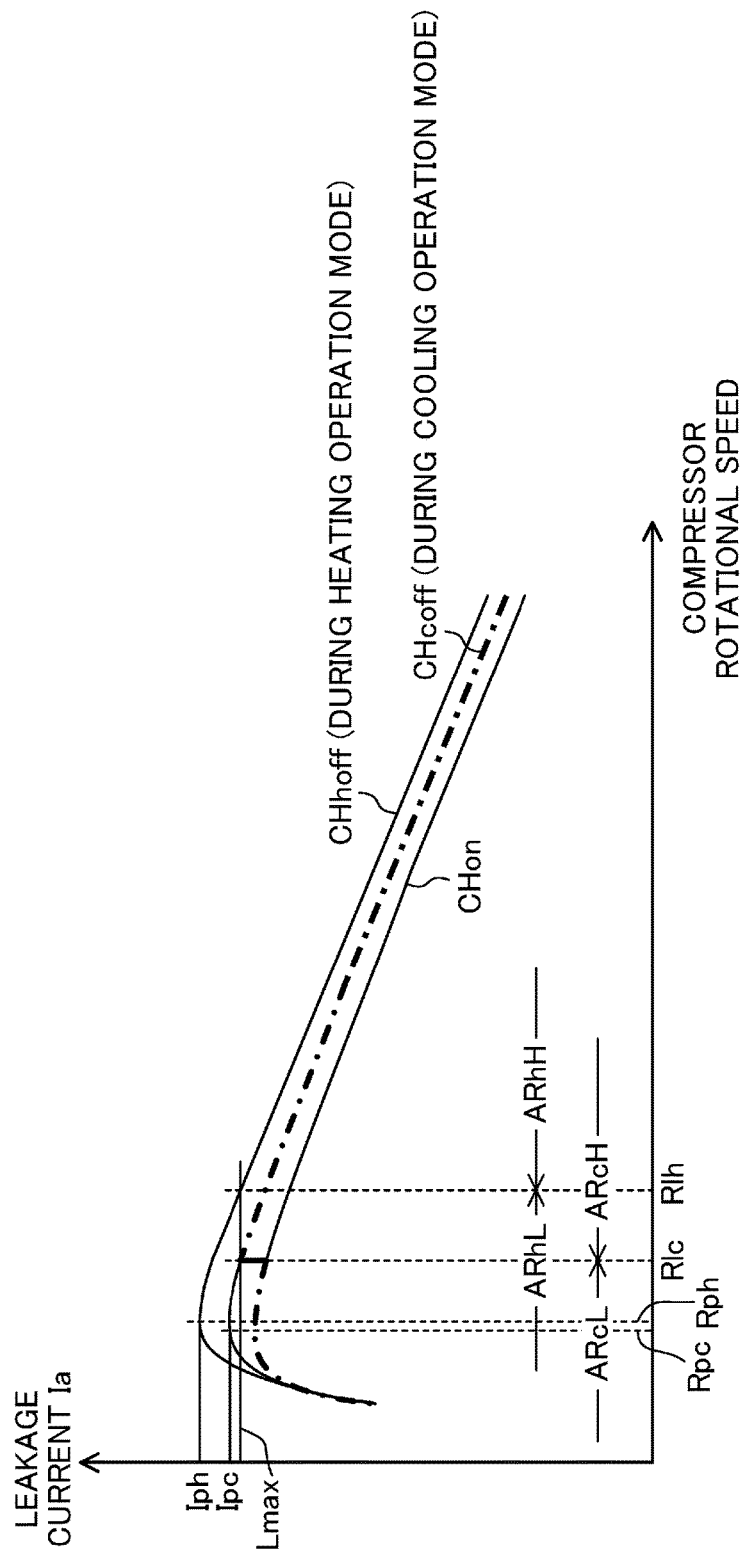
FIG. 5 shows how leakage current is controlled in a cooling operation mode.

Likewise, in the cooling operation mode, while the rotational speed falls within the rotational speed range (ARcL) lower than the set rotational speed (Rlc) corresponding to the limiting value (Lmax), the compensation current output (80) operates to allow the compensation current (Ic) to flow so that the leakage current (Ia) is less than the limiting value (Lmax), as indicated by the dash-dot line shown in FIG. 5. After the rotational speed has reached the set rotational speed (Rlc), the compensation current output (80) stops, so that the leakage current (Ia) increases to the limiting value (Lmax), and then decreases gradually.

Advantages of Embodiment

As can be seen from the foregoing description, according to this embodiment, switching may be controllably performed between on and off operations of the compensation current output (80) according to the rotational speed of the compressor (CM), and the compensation current (Ic) may stop being supplied when not needed. This may reduce power loss as compared to a situation where, as in the known art, compensation current is always supplied.

In particular, after the previously measured rotational speed (Rlh) or (Rlc) of the compressor corresponding to the limiting value (Lmax) specified under the Electrical Appliances and Materials Safety Act or by the IEC has increased to a rotational speed higher than or equal to the set rotational speed (Rlh) or (Rlc) corresponding to the limiting value (Lmax) after the activation of the compressor (CM), the compensation current output (80) is stopped. This may effectively reduce the degree of increase in power loss while specifications on the magnitude of the leakage current (Ia) are met.

The set rotational speeds (Rlh, Rlc) corresponding to the limiting value (Lmax) in the heating and cooling operation modes are controlled to be different from each other. This may minimize power loss while regulations are satisfied, irrespective of whether the refrigerant circuit (90) operates in the heating or cooling operation mode.

Other Embodiments

The configuration for the converter circuit (10) according to the foregoing embodiment is merely an example, and any various other rectifier circuits, such as a bridgeless converter circuit, may be used as the converter circuit. The configuration for the inverter circuit (40) is also merely an example, and various other circuits may be used as the inverter circuit. Likewise, the leakage current detector (70), the compensation current output (80), and other components may each have various other configurations. The switch (SW) provided for the compensation current output (80) may be located near the coupling capacitor (Cb).

Further, the power factor improver (20) according to the foregoing embodiment does not always have to be provided. A three-phase alternating-current power supply may be used as the alternating-current power supply (2). In addition, the refrigerant circuit of the air conditioner is merely an example, and may have various configurations. The refrigerant circuit is not limited to that of an air conditioner, and merely needs to be a refrigerant circuit of a refrigeration apparatus.

INDUSTRIAL APPLICABILITY

The present invention is useful as a power converter driving a compressor.

DESCRIPTION OF REFERENCE CHARACTERS

1 Power Converter
CM Compressor
3 Motor
10 Converter Circuit
40 Inverter Circuit
50 Controller
55 Rotational Speed Sensor
70 Leakage Current Detector
80 Compensation Current Output
SW Switch

The invention claimed is:

1. A power converter comprising:
a converter circuit configured to convert alternating current into direct current; and
an inverter circuit connected to the converter circuit, and configured to convert the direct current, into which the alternating current has been converted, into alternating current,
the power converter being configured to supply the alternating current, into which the direct current has been converted by the inverter circuit, to a compressor,
the power converter further including:
a compensation current output configured to output compensation current (Ic), which compensates for leakage current leaking from the compressor, to a current path through which the leakage current flows; and
a controller configured to switch between on and off operations of the compensation current output according to a rotational speed of the compressor.

2. The power converter of claim 1, wherein
the controller switches the compensation current output from an on state to an off state when the rotational speed of the compressor has increased to a set rotational speed at which the leakage current is lower than or equal to a predetermined limiting value in a state where the compensation current output is off.

3. The power converter of claim 2, wherein
the compressor is disposed in a refrigerant circuit which has cooling and heating operation modes, and
the controller controls the set rotational speed so that a set rotational speed in the cooling operation mode is different from a set rotational speed in the heating operation mode.

* * * * *